(No Model.)
G. P. B. HOYT.
CYCLOMETER.
No. 339,891. Patented Apr. 13, 1886.
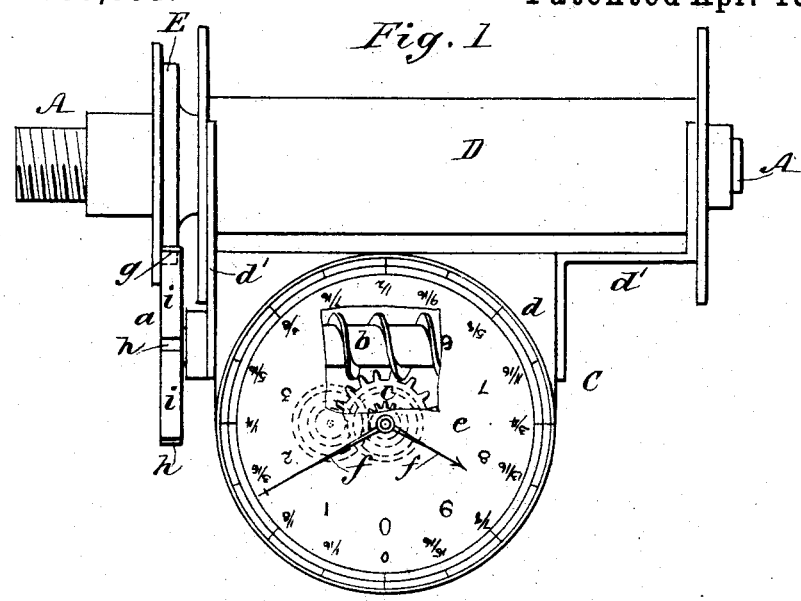
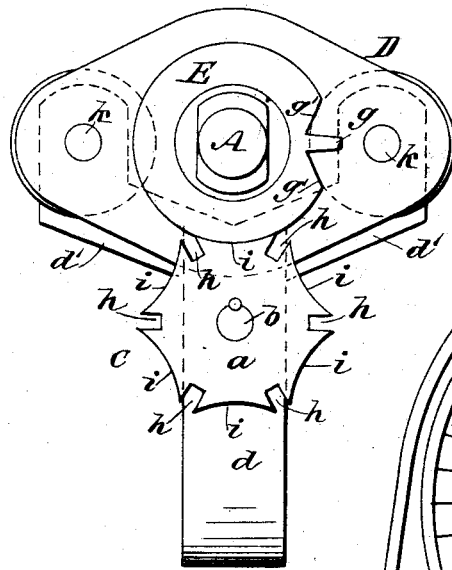
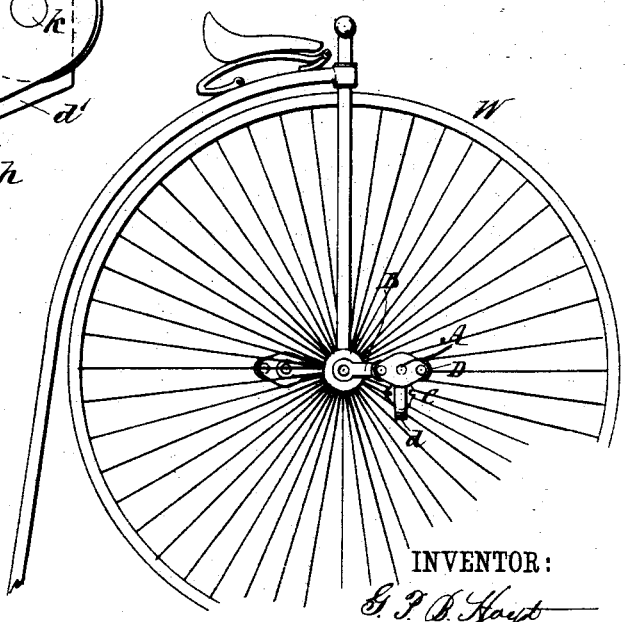
WITNESSES:
INVENTOR:
G. P. B. Hoyt
BY Munn & Co.
ATTORNEYS.

UNITED STATES PATENT OFFICE.

GABRIEL P. B. HOYT, OF JAMAICA, NEW YORK.

CYCLOMETER.

SPECIFICATION forming part of Letters Patent No. 339,891, dated April 13, 1886.

Application filed November 28, 1885. Serial No. 184,171. (No model.)

*To all whom it may concern:*

Be it known that I, GABRIEL P. B. HOYT, of Jamaica, Queens county, State of New York, have invented a new and useful Improvement in Cyclometers, of which the following is a specification.

The cyclometers now in use on bicycles and similar vehicles are suspended from the axle or from the spokes of the wheel, and depend upon the force of gravity for their operation, and, owing to unsteadiness both of the cyclometer and the wheel of the bicycle, they are inaccurate. Besides, being suspended within the spokes of the wheel, they are unsightly, and occupy the only available space for a lantern.

The object of my invention is to overcome these objections; and my invention consists, principally, in combining a cyclometer with a crank-pin of a bicycle or similar vehicle.

My invention also consists of a cyclometer constructed to receive positive, intermittent, or stop motion from a point, projection, or cog-wheel arranged to revolve with the crank or other part of the bicycle.

Reference is to be had to the accompanying drawings, forming a part of this specification, in which similar letters of reference indicate corresponding parts in all the figures.

Figure 1 is a front elevation of a pedal and crank-pin of a bicycle having my new cyclometer applied thereto, a part of the face or dial of the cyclometer broken away to show the construction of the registering mechanism. Fig. 2 is an end elevation of the same. Fig. 3 is a side elevation of a part of a bicycle, showing the crank-pin and pedal with cyclometer attached in position for use.

A represents the crank-pin of a bicycle, adapted to be rigidly secured to a crank, B, of the bicycle, so as to revolve therewith, and making one revolution for every revolution of the wheel W.

To the crank-pin A is attached the cyclometer C, and above the cyclometer is applied to the crank-pin the pedal D, that turns loosely upon the pin in the ordinary way.

Rigidly secured to the crank-pin A is the device or plate E, for operating the cyclometer or registering device, for registering the revolutions of the wheel W or the distance covered.

The cyclometer consists, essentially, of a notched operating-plate, $a$, a worm-shaft, $b$, and registering mechanism $c$, the worm-shaft and registering mechanism being inclosed in a suitable casing, $d$, provided with end flanges, $d'$, for attaching the cyclometer to the pedal-spindles $k\,k$, and provided also with a dial, $e$, before which the pointers $f$ move, and on which are marked graduations indicating distances in miles and parts of miles.

The plate E on the crank-pin is, by preference, for the most part made circular with the single peripheral projection or point $g$. The plate $a$ on the worm-shaft $b$ is, by preference, formed with several equidistant notches $h$, into which the point $g$ is adapted to strike as the plate E and crank-pin A revolve for imparting an intermittent rotary motion to the plate $a$, worm-wheel $b$, and registering mechanism $c$, and hands $f$. Between the notches $h$ the plate $a$ is formed at its edge with the concaves $i$, each forming an arc of a circle having the same radius as the circle described by the circular portion of the disk E. The object of this is so that the disk E will accurately fit in the concaves $i$ and act as a stop to the plate $a$ and other mechanism of the cyclometer, and prevent them from revolving in either direction, except while the point $g$ is in contact with the plate $a$. The plate E is cut away at each side of the point $g$, as shown at $g'\,g'$, Fig. 2, to prevent binding of the plates E $a$ at the time the point $g$ passes the notches and operates the plate $a$.

The cog-wheel $c$ imparts motion directly to the long hand $f$, while the short hand is given a slow motion equal to one-tenth the speed of the long hand by means of an ordinary train of clock-gearing. (Shown in full and dotted lines in Fig. 1.)

Having thus fully described my invention, I claim as new and desire to secure by Letters Patent—

1. The combination, with the crank-pin and the pedal of a bicycle or similar vehicle, of a cyclometer, C, attached to the pedal, and means, substantially as described, for operating the cyclometer, as and for the purposes set forth.

2. The crank-pin A of a bicycle or similar vehicle, having an operating plate or device, E, rigidly secured thereto, in combination with registering mechanism attached to the pedal and an intermediate plate or device for causing the plate E to operate the registering mechanism, substantially as described.

3. The crank-pin A and notched or toothed plate E, secured thereto, and the pedal D, having the cyclometer C secured thereto, in combination with the notched and curved plate $a$, the worm-shaft $b$, and the gear mechanism of the cyclometer, the plate $a$ being held in close contact with the toothed plate E on the crank-pin, substantially as described.

GABRIEL P. B. HOYT.

Witnesses:
H. A. WEST,
C. SEDGWICK.